United States Patent [19]

Osawa

[11] 4,146,316

[45] Mar. 27, 1979

[54] AUTOMATIC FOCUS ADJUSTING SYSTEM

[75] Inventor: Noriaki Osawa, Tachikawa, Japan

[73] Assignee: Nihon Beru-Haueru Kabushiki Kaisha, Higashimurayama, Japan

[21] Appl. No.: 898,046

[22] Filed: Apr. 20, 1978

[30] Foreign Application Priority Data

Apr. 21, 1977 [JP] Japan .............................. 52/045192

[51] Int. Cl.² .............................................. G03B 7/08
[52] U.S. Cl. .................................................... 354/25
[58] Field of Search ................... 354/25, 31; 352/140; 355/56; 250/201, 204; 356/1, 4

[56] References Cited

U.S. PATENT DOCUMENTS 4,091,275  5/1978  Wilwerding ....................... 354/25 X

Primary Examiner—Michael L. Gellner
Attorney, Agent, or Firm—Aaron Passman; Roger M. Fitz-Gerald

[57] ABSTRACT

Disclosed is an improvement in an automatic focusing system for use with an optical instrument having a focusable objective which is adjustable in response to optical and electronic components of the system for determining object distance of a remote subject by comparing images of scanning and reference optical systems. The scanner of the optical system is driven oscillatably across an angle to detect a subject between infinity and the minimum focus condition of the objective lens. The present invention relates to improvements in an automatic focusing system for use with an optical instrument having a focusable objective. More particularly, the improvement relates to driving the focusing system to a preset fixed focus setting when the system senses difficult conditions for focus detection as those having low contrast or complex subject matter.

A warning device is included to be activated thereby cautioning the operator that the automatic focus system has reached its operational limit. However, the repeated occurrences of irregular or error signals must be present before the warning device will operate.

10 Claims, 11 Drawing Figures

AUTOMATIC FOCUS ADJUSTING SYSTEM

BACKGROUND OF THE INVENTION

This invention relates to an automatic focus adjusting system and more particularly to an automatic focus adjusting system wherein the focus adjustment is automatically turned off when the object or shooting conditions are not suitable for automatic adjustment. For instance, conditions of low contrast and/or high density of similar subject matter with a deep field of view present difficulties to automatic focusing. Of the many devices for adjusting focus automatically, each has its functional limits. A few specially designed systems work for special purposes, but because of the aforesaid limitations errors can occur in adjusting focus or measuring the subject distance. One reason for such errors comes from the fact that the object to be focused upon is a gathering of several objects which are not placed within the same plane (at right angle with optical axis) and they are not at the same distance from the camera. A small object near the camera appears the same size as a large object which is far away, to automatic focus adjusting devices. The distance to which the objective lens should be focused is not obtainable and confusion results because in such devices the focusing is done by comparing the light from the several objects. Similarly, such devices cannot focus the lens when the amount of light is insufficient or when the object has low contrast or little or no difference in contrast.

Improvements are continuously being made to optical instruments such as cameras having a focusable objective lens. One of the more recent series of improvements is an automatic focusing system for adjusting the focus of the lens to an object distance corresponding to the distance of the camera to remote subjects in the field of view of that lens. Typically, an automatic focusing system may use the principle of spatial image correlation wherein a scene imaged by a first auxiliary optical system is scanned by a sensor and the image therefrom is correlated electronically by another sensor with an image from a fixed auxiliary optical system. Such an automatic focusing system has electronics for evaluating the light bundles from images passed through those optical systems and impinging on sensor arrays. Electronics are used to control power for a motor for driving the focusing lens of an objective in accordance with the relationship of the images transmitted by the optical systems. Focus of the objective occurs when the images from the optical systems are coincident; under such conditions the position of the scanning optical system is related to the position of the objective lens.

Certain of the automatic focusing systems, as described in recently issued United States patents, can be mass produced, are not unduly complex, bulky, and expensive, and are reliable for use in optical instruments or cameras for the mass market. Such systems include a scanning means, which moves an optical axis to sweep an image across a light sensitive array, and which is connected with another similar array of a distance detector. One of the optical axes is fixed relative to the rangefinder and camera lens and the other is moveable so as to scan along the other optical axis. An automatic rangefinder of the type generally described in U.S. Pat. No. 4,002,899 assigned to Honeywell, Inc. and called the Honeywell Visitronics module responds to the two optical systems that bring light from the subject to a detector having a pair of photo sensitive arrays. The module is responsive to the fact that the axes of the optical systems are aligned with one another and directed toward the same subject. Such alignment causes the detector to generate a peak pulse which pulse can be used to adjust the focus of the camera lens. Rangefinding is accomplished by triangulation and comparison of the image from the fixed axis with the image from the scanning axis. By means of suitable electronic circuitry the peak signal can be converted to a control signal for the focusing motor.

SUMMARY OF THE INVENTION

The present invention is designed to compensate for the difficulties of low contrast and complex scenes by detecting unsuitable conditions (for automatic focus adjusting) and providing a warning and correction. Such systems can handle several peak pulses per scan cycle, but are unable to analyze a great number of peak pulses per scan (crowded field of view) or no peak pulses (low or no contrast situations). Under such circumstances the module issues irregular or error signals which cause the lens to be automatically adjusted to a selected fixed focal position as predetermined manually by the user. However, a threshold of a prescribed number of scan cycles with irregular signals must be passed before the lens is sent to its fixed focus position. Electronic circuitry constantly monitors the signals to determine whether to automatically focus or not. The electronic circuitry provided considers the data related to the conditions of the scene to be photographed and directs the operation of the automatic focusing system in accordance therewith. Such circuitry includes circuits for directing, per an operator setting, the controlled operation of the camera when the automatic focusing is not properly useable.

OBJECTS OF THE INVENTION

An object of the present invention is to provide an improved automatic focusing system which is sensitive to irregular or error signals resulting from complex subject matter or low contrast in the subject matter.

Yet another object of the invention is to provide circuitry to electronically correlate the settings of adjustable lens and to drive the lens to a fixed focus position for conditions wherein the automatic focus system is incapable of measuring the focus.

DETAILED DESCRIPTION OF THE DRAWINGS

Figure 1:
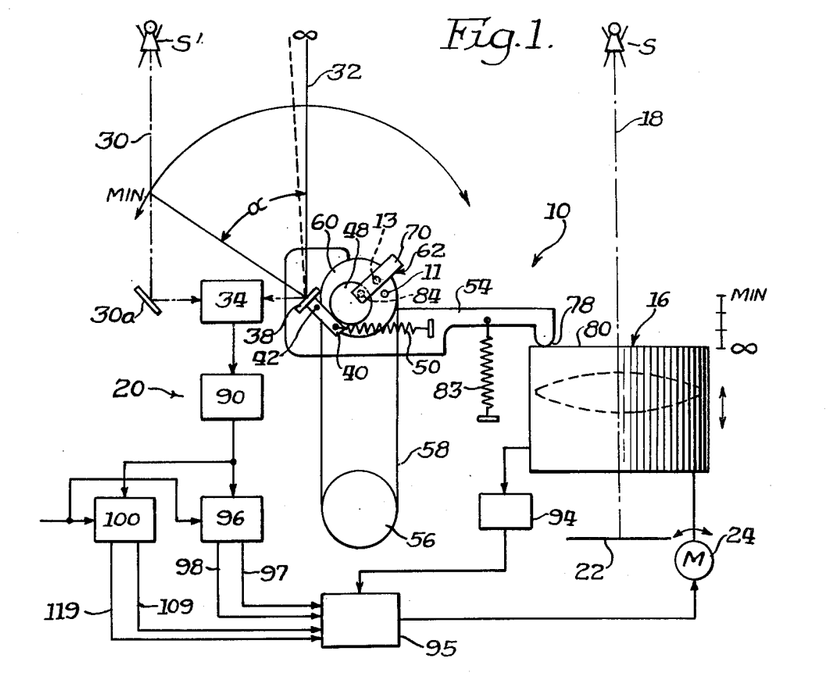
FIG. 1 shows a schematic diagram of an automatic focusing system and the electronic control circuitry of the present invention.

Referring now to FIG. 1, an optical instrument, for example a camera 10, is shown with a focusable objective lens 16 defining an optical axis 18, and an automatic focusing system circuitry 20. The objective lens 16 or a focusing cell thereof is adjustable axially along the optical axis 18 for imaging of a remote subject S at given range of camera-to-subject or object distances onto an image plane 22 of the camera. The automatic focusing system is connected electrically to a drive motor 24 which is mechanically coupled to the objective lens 16 so that the position of the objective lens 16 is adjusted for focus at the object distance of the remote subject as determined by focusing system circuit 20.

Optically, the automatic focusing system includes a pair of optical systems 30, 32 which image light rays of the remote subject on a detector 34, such as the Honeywell Visitronics module. The first optical system 30 is oriented parallel with the optical axis of the objective lens 16 and functions to form on the detector a reference image of the subject S', which is the same as subject S. A mirror 30a is included in the first optical system 30 to direct incoming light to the module 34. The second optical system 32 is arranged a spaced distance from the first optical system, and includes a movable sensor or scanner shown as a mirror 38 which is movable to sweep the optical axis through an angle α (alpha). The sweep of the angle extends from an orientation substantially parallel with but intersecting the optical axis of the first optical system at a substantial object distance, to an angle intersecting the optical axis of the first optical system at an object distance substantially comparable to the minimum focusing distance of the objective lens 16. When the scanner is oriented to correspond to the object distance at which the objective lens is set, the arc or aspect of the sweep is divided on both sides (bisected) of a perpendicular to the surface of the scanner 38. As the scanner sweeps the field, the image of the second optical system 32 moves relative to the image of the first optical system 30. These optical systems image the light bundles on the light sensitive arrays of detector 34, to indicate the focus when images from the respective optical systems impinge on the detector arrays in coincidence.

Through circuitry 20 of the automatic focusing system the motor 24 for driving the objective lens 16 is selectively energized to adjust the position of the objective lens toward and from the image plane 22. This movement enables the object distance setting to be altered to focus the image of the subject S on the image plane 22 at various distances between infinity, a maximum focus condition and a minimum focus condition for the lens 16. Other circuitry controls energizing of a motor (not shown) for the scanner. Still other circuitry determines the position of the scanner member 38 for correlation with the orientation of the objective lens 16.

More particularly, the movable scanner 38 is supported by the scanner holder 40 which is pivoted about an axis 42. The scanner holder 40 is moved in an oscillating manner by a driven eccentric or cam 48 toward which a portion of the holder 40 is biassed into continuous engagement by a spring member 50 and which is attached at its other end to a base level member 54. Drive of the cam 48 is provided by a powered pulley 56 which is connected by a belt 58 to a pulley 60 to which the cam is either fastened in a known manner or may be formed integrally. The powered pulley 56 is drivable by a motor (not shown). The cam 48 is arranged eccentrically of the pulley 60 axis to cause the movable scanner member 38 to sweep through an angle α (alpha) during one half of each revolution of the pulley 60. This scanning angle is larger than the field of view and range of focus of the objective lens 16, and will detect subjects within the range of focus so that the object distance can be determined. Since the scanning angle is double the possible object angle, the subject will be located even at the extreme opposite ends of the scanner path. The bisector of the scanning angle can be aligned with subject when the object of the objective lens 16 is adjusted to the distance.

To correlate the position of the scanner 38 with an object distance, the pulley 60 is provided with a position indicator system 62 which enables a sensing system to relay information as to the position of the automatic focusing system. In the embodiment, as shown in FIG. 1, the position indicator system 62 includes signal contacts 11 and 13 shown thereon. A frame 70, which is supported by a shaft 84 about which the pulley 60 is rotated, supports contact 13 and contact 11 is carried on pulley 60. The scanner holder 40, the pulley 60, and the frame 70 are carried by the movable base lever member 54 which is rotatable about an axle arranged coaxially with the axis 84 around which the scanner support 40 moves. The position of the base lever member 54 and the components supported thereon is a function of the position of the objective lens 16.

A contact tip portion 78 of the base lever is biassed into engagement with a rim 80 of the objective lens by a spring member 83 fixed at its other end to the camera (not shown). As the objective lens is adjusted axially to an object distance for focusing of the image of a remote subject on the image plane 22, the rim 80 is adjusted in a corresponding manner. Through the contact member 78, the base lever rotates about an axis 84 thereby causing a change in the scanning aspect of the movable scanner. That is, the tip of the lever 54 can be formed so that the scanner is perpendicular to the subject when in a position corresponding to the focused condition of the objective lens 16, i.e., in the middle of its scanning arc as driven by the cam 48. Therefore, for example, when the objective lens 16 is adjusted to an object distance focus of five meters, the scanner sweeps an angle of α (alpha) degrees, respectively, across the position of five meters.

While not shown, the movable base lever 54 can be rotated about the axis 84 in a counter clockwise direction from the orientation of FIG. 1. The scanner 38, the pulley 60, and other components supported on the base lever 54 are adjusted toward a minimum object distance condition. The scanning arc of the scanner would sweep cyclically through a predetermined angle α (alpha), across the position of the minimum focus distance. The bracket 70 is movable about the axis 84 of the pulley 60. For each rotation of the pulley, pulses of current from contacts 11 and 13 are permitted to flow as the pulley rotates. The contacts 11 and 13 can be arranged with respect to the cam 48 so that each signal or pulse occurs when the movable scanner member 38 faces the position corresponding to the object distance setting of the objective lens 16. Correction of the relative positions of the components may be made by adjusting the positions of the bracket 70 about the axis 84.

Since the signal generator 62 is fixed to the pulley 60, and the scanner drive cam 48 is likewise fixed to the pulley 60, the orientation of the drive cam 48 and therefore of the scanner 38 is known. The scanner is "on-subject" at some condition of the cam. As the cam 48 and the signal generator 62 are relatively fixed together, the position of the scanner member 38 can be determined and translated into either electrical or other data output.

Figure 5:
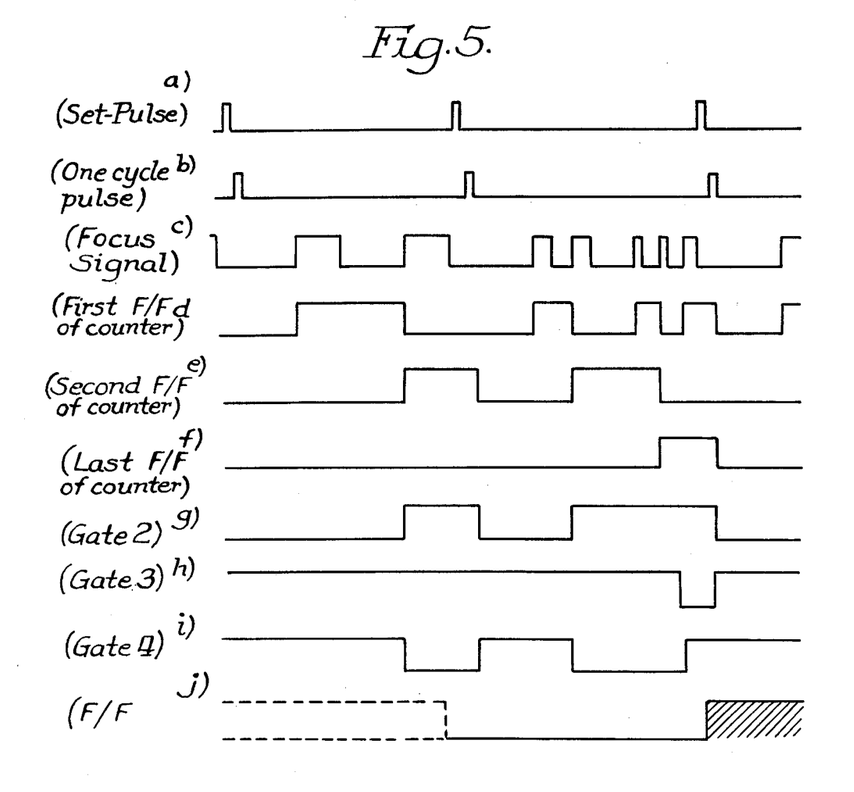
FIG. 5 shows time versus pulse waveform diagrams of the signals in the electronic control circuits in the present invention.

The coincident signal or peak pulse from the module 34 is directed along circuit 20 to generate a control signal for lens control motor 24. More specifically, the time versus pulse diagrams of FIG. 5 show the output at various points within the circuit 20 relative to the time of the scan cycles. FIG. 5(a) represents a periodic (one scan cycle duration) signal or pulse emitted to set the circuit 20 in condition for operation. FIG. 5(b) is a time versus pulse diagram representative of the state of the contacts 11 and 13 for position indicating system 62 and it indicates the duration of one scan cycle. FIG. 5(c) is a time versus pulse diagram of the signal from detector 34 indicating correlations; the pulses are shown as modified by the electronic wave shape forming circuit 90 which basically blocks the pulse wave to an on or off condition to accentuate the peak signals. The number of peak pulses per scan are determined in FIGS. 5(d, e, and f) by a counter composed of flip-flop circuits connected in cascade fashion.

Referring to FIG. 1, shaped detector signals are fed to an error detecting circuit 100 having a counter 101 (FIG. 2) which receives clocked pulses of a set frequency shown in FIG. 5(b) as input 103 said pulses being generated by the switch contacts 11 and 13, FIG. 1.

Figure 2:
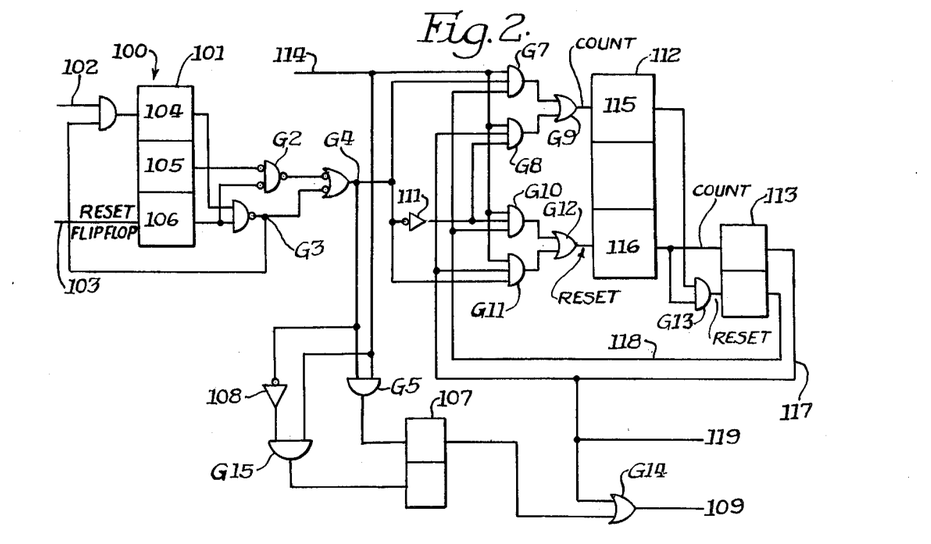
FIG. 2 shows a schematic diagram partially in block form of the error setting circuit.

The error detecting circuit 100, FIG. 2, has AND circuit G1, three step counter 101, OR circuit G2, and NAND circuits G3 and G4. AND circuit G1 limits the input to no more than five focus signals. When the counter 101 has counted five focus signals, input ceases. For example, when seven focus signals are generated during one scanning cycle, only five of seven are counted by the counter 101. The sixth and the seventh focus signals are not counted because AND circuit G1 does not output the sixth and the seventh focus signals after counter 101 has counted five signals.

Counter 101 counts the number of focus signals during one scanning cycle that is to say one cycle pulse FIG. 5(b) and 5(c). If there is only one focus signal, the output is produced at the first flip-flop 104. If two focus signals are generated, the output is produced from second flip-flop 105 and, if there are three focus signals, the outputs are from the first flip-flop 104 and the second flip-flop 105. Four focus signals output from the third flip-flop 106, and five focus signals output from the first flip-flop 104 and the third flip-flop 105. Two to five focus signals are normal, but more or less than that is irregular or an error signal. OR circuit G2 is provided to detect when no focus signal or only one focus signal is generated, and NAND circuit G3 is to detect more than five signals. NAND circuit G4 detects error conditions and outputs an error signal to next circuit when such condition is detected.

Counter 101 is reset each scanning cycle by the cam contacts 11 and 13 via 103 after which focus signals from the wave forming circuit 90 can again be input at 102.

In the circuit explained, no focus signal is input at 102, when two inputs of NAND circuit G3 are low and one input of AND circuit G1 is high. The focus signals from an input of AND circuit G1 are fed to counter 101; when both inputs are high, the output of circuit G1 is high. No focus signal is input to circuit G1, when the inputs are high and low because the output is low and is not fed to the counter 101.

If one focus signal is fed to the counter 101, the output from the first flip-flop 104 is input to the NAND circuit G3. Since the two inputs to G3 are high and low, the output is high and is fed to NAND circuit G4 (and AND circuit G1). The output of G4 also becomes high and is fed to next circuit. If two focus signals are fed to the counter 101 through AND circuit G1, the output of counter 101 from the second flip-flop 105 is fed to OR circuit G2. The output of G2 becomes high and is fed to one input of NAND circuit G4. The other input to G4 is also connected to the output of NAND circuit G3 which is high so the output of NAND circuit G4 is low, whereby no error signal is fed to next circuit.

If three focus signals are input to counter 101, outputs from the first flip-flop 104 and second flip-flop 105 are fed to NAND circuit G3 and OR circuit G2. Since the inputs of the circuit G3 are high and low, the output is high. Similarly, the output of OR circuit G2 is high since one input of G2 is high and the other is low (the one connected with the input of the circuit G3). Therefore, both inputs of NAND circuit G4 become high, output of G4 becomes low, and no signal is fed to next circuit. If four focus signals are fed to counter 101, the third flip-flop 106 produces the output which is fed to OR circuit G2 and NAND circuit G3. The two inputs of G3 become respectively high and low and the two outputs of G2 also becomes respectively low and high, and inputs of G2 and G3 become high. No output from NAND circuit G4 is fed to next circuit. If five signals are fed to the counter 101 through circuit G1, the first flip-flop 104 and the third flip-flop 106 produce outputs. The output from the first flip-flop 104 is fed to NAND circuit G3, and the output from the third flip-flop 106 is fed to G3 and OR circuit G2. The two inputs of G3 are high and its output becomes low, and the two inputs of circuit G2 are low and high; its output is high. The output of NAND circuit G4 is high. Thus, the output of G4 if fed to next circuit. When the output of said circuit G3 becomes low, the two inputs of AND circuit G1 become low, and the output of G1 is low which means that more than five signals cannot be fed to counter 101 but stopped at AND circuit G1.

The time interval pulse between the adjacent scanning signals is shown in FIG. 5(d) as a pulse that runs from the start of first pulse to the start of the next. FIG. 5(e through i) are pulse diagrams for indicated portions of the circuit between inputs 102 and 103 and gate G4 of FIG. 2.

In FIG. 2 the error detecting circuit 100 is shown schematically. In operation the input signal 102 from the focus detector 34 via the wave shaper 90, and input signal 103 from the cam contacts 11 and 13, are used to set and re-set counter 101 which includes three flip-flops 104, 105, and 106 arranged as explained such that their outputs are a function of the number of focus detection pulses per scan. More particularly, if there are less than two pulses or more than five pulses per scan from detector 34, there is a "no go" signal generated as shown in FIG. 5(i). The opposite condition where the pulses per scan are between two and five provides a "go" signal also shown in FIG. 5(i).

In order that the detector signal is considered on an average basis (more than for one sweep), a further circuit considers the output at G4 at least four or five times before triggering the control outputs shown as 119 and 109 in FIGS. 1 and 2. The circuit which assures that sufficient cycles are considered is shown in FIG. 2 and is connected between the output of gate G4 and the output connections 119 and 109 and is called the error set circuit. The error set circuit is part of error detecting circuit 100 shown at the right side in FIG. 2 it has two invertors, seven AND circuits, two flip-flop circuits, one counter, and three OR circuits. As shown in the timing chart FIG. 5, input 114 provides a set-pulse as shown in FIG. 5(a) which is generated by the calculating circuit 96 prior to the scan-cycle-pulse. AND circuit G5 transmits the output from NAND circuit G4 after the pulse is received from input 114 thereby detecting the error condition at each scanning cycle and setting a flip-flop circuit 107.

Invertor 108 and AND circuit G15 re-set flip-flop circuit 107 after a regular focus signal is generated; the output of circuit G4 becomes low. Flip-flop 107 holds the error condition detected by AND circuit G5 and OR circuit G14 feeds the error signal from the flip-flops 107 and 113. More particularly, flip-flop 113 holds the error condition until another regular focus signal occurs. Counter 112 is necessary to count the number of error condition cycles or regular focus signal cycles. AND circuit G13 detects the regular focus signal cycle and re-sets the flip-flop circuit 113. AND circuit G7 connects the output from NAND circuit G4 to counter 112 through OR circuit G9 when an error condition is detected only if flip-flop 113 is not set. AND circuit G8 feeds the set-pulse through OR circuit G9 to counter 112 when regular focus signal occurs after the error condition has continued for a while if flip-flop 113 is set. Or circuit G9 feeds the output from circuit G7 or G8.

AND circuit G10 clears (or re-sets) counter 112 when the output of circuit G4 becomes low and when the flip-flop 113 is not set. AND circuit G11 clears (or re-sets) the counter 112 when the output of circuit G4 is high and flip-flop 113 is set. AND circuit G12 feeds the output from circuit G10 and G11. Invertor 111 inverts the low output of circuit G4 to a high output so as to balance with the inputs of circuit G10.

When the error focus signal is detected by error detecting circuit 100 and the output of NAND circuit G4 becomes high, its output is fed to an input of AND circuit G5. When the set-pulse from input 114 is fed to the other input of circuit G5, the flip-flop circuit 107 is set since its inputs are high. The output of flip-flop 107 is fed to an input of OR circuit G14. Thus, the two inputs of circuit G14 are low and high. The output of circuit G14 becomes high and is fed to next circuit through output end 109. When the output of OR circuit G4 is low, the output of AND circuit G5 does not become high even though the set-pulse is fed to an input of circuit G4. The low output of circuit G4 is inverted to be high by inverter 108, that high output is fed to an input of AND circuit G15. Set-pulse from input 114 to G15 is high. The output of circuit G15 is also high and is fed to the flip-flop 107 to re-set it.

Flip-flop circuit 113 is in re-set condition when the regular focus signals are continuously generated, one of its outputs is low and the other is high. The latter is fed to AND circuits G10 and G7 causing the output of NAND circuit G4 to become high for AND circuits G7 and G11 after the set-pulse is fed to the four AND circuits G7, 8, 10 and 11. Thus, the three inputs of AND circuit G7 become high, the output of circuit G7 is high. G7 output is input to the first flip-flop 115 of counter 112. Flip-flop 113 is not set until the counter 112 counts four high states of NAND circuit G4. Four cycles of the output of circuit G4 are counted by counter 112; the output is received from the third flip-flop 116 of counter 112 (which is input to flip-flop 113 and sets it). The output of flip-flop 113 to G14 authorizes a signal 119 for the next circuit, and it is also fed to AND circuits G8 and G11. The fifth output from NAND circuit G4 and set-pulse are input to AND circuit G11, three high inputs to circuit G11 gives an output to the third flip-flop 116 of counter 112 through OR circuit G12 to re-set the counter 112. That is to say, the counter 112 is re-set by counting each of the four outputs from the circuit G4, but the flip-flop 113 is in set condition while the high outputs from circuit G4 are continuously fed to counter 112. When the flip-flop 113 is in set condition and the output of NAND circuit G4 is low, the inverter 108 inverts the output of circuit G4 to be a high input to AND circuits G8 and G10. That condition with a set-pulse and the three high inputs of circuit G8 results in a high output to the first flip-flop 115 through OR circuit G9. If that condition continues as set-pulse is fed to circuit G8 five times, the counter 112 outputs come from the first flip-flop 115 and third flip-flop 116 which are both fed to inputs of AND circuit G13. So, the output of AND circuit G13 becomes high and is fed to flip-flop circuit 113 to re-set it. That is to say, when error focus signal is detected continuously for four times, an error set signal is generated and fed to next circuit, but on the other hand, when regular focus signal is detected continously for five times after one error set signal, the error condition is released and no signal is fed to next circuit. When the flip-flop circuit is not in the error condition, a high output is fed to AND circuit G10. The low output from NAND circuit G4 is inverted to be high and is fed to other input of circuit G10; the output of circuit G10 becomes high and is input to the third flip-flop 116 of the counter 112 through OR circuit G12 to clear (or re-set) counter 112. Thus, flip-flop 113 does not count regular focus signals.

Figures 6, 7:
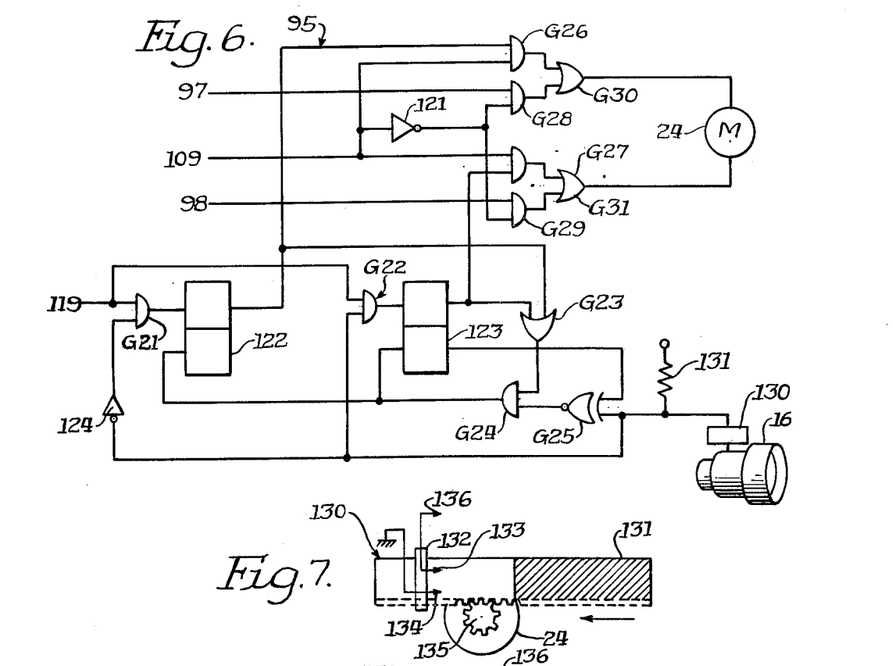
FIG. 6 shows a schematic diagram partially in block form of the lens drive control circuit which adjusts the lens to the preset lens position for fixed focus operation.
FIGS. 7 through 11 show schematically the lens positioning mechanism in various positions of operation.

Consequently, the output signals from 109 and 119 are both stimulated when the detector pulses are between two and five in frequency per scan for a period of more than five scans, but only output 109 is activated when the signals from detector 34 are less than two or more than five for a period of four scans. The foregoing signals are inputs as shown in FIG. 6 for the lens drive control circuit 95. Other inputs for control circuit 95 are inputs 97 and 98 from calculating circuit 96; those inputs represent the control for the autofocus. That is to say that, the amount and direction of the lens movement necessary to automatically focus the camera are a function of the signals 97 and 98. The calculating circuit 96 takes the timing of the cam impulses (contacts 13 and 11 per FIG. 5(b)) and the timing of the detector signals from the wave shaper 90 and compares same to generate the appropriate signals 97 and 98. As shown in FIG. 6, the signals 109 and 119 are both necessary to permit the motor 24 to drive the lens 16; this is a "go" condition wherein the signal or pulses from detector 34 are between two and five per scan. If, however, the signal 109 is not accompanied by signal 119, the control via signals 97 and 98 (autofocus) is prevented by means of the gating shown.

In FIG. 6 the lens drive control circuit 95 has four input ends, two inverters, two flip-flop circuits, three OR circuits, one exclusive OR circuit, seven AND circuits, one resistor, one motor, and one lens position detecting mechanism. Lens position detecting mechanism 130, as explained later, moves the lens to pre-determined position when focus correction is necessary. Lens position detecting mechanism 130 connects one of the inputs to exclusive OR circuit G25 which is held thereby in a low state by a resistor 131. When detecting mechanism 130 is not so connected, the input to the exclusive OR circuit G25 is held in a state by resistor 131. Motor 24 moves the lens position by rotating in either clockwise or counterclockwise direction as decided by the signal coming from OR circuit G30 or OR circuit G31. Motor driving signals from calculating circuit 96 are input at 97 or 98 according to the motor driving direction required. AND circuits G28 and G29 provide a high output for OR circuits G30 or G31 to rotate motor in either a clockwise or counterclockwise direction when no error focus signal is available at 98, and provide a low output to stop motor rotation when there is an error signal. AND circuits G26 and G27 provide a high output to rotate motor 24 in a direction according to the output of flip-flops 122 or 123, which selectively transmits a signal according to the lens position when error set signal is fed from input end 119. Flip-flops 122 and 123 decide the lens rotating direction from the error set signal. AND circuit G21 provides a high output to flip-flop 122 when the lens position detecting mechanism 130 is connected and when the error set signal is received at end 119. Inverter 121 inverts the low output from lens position detecting mechanism 130 to a high output so as to balance inputs of circuit G21. A high output from circuit G21 sets the flip-flop 122. AND circuit G22 provides a high output to flip-flop 123 when lens position detecting mechanism 130 is not connected and when error set signal is received from end 119 thereby setting flip-flop 123. OR circuit G23 detects the set condition either of flip-flop 122 or 123, and AND circuit G24 provides a high output to re-set flip-flop 122 or 123 when the lens reaches a predetermined position. Exclusive OR circuit G25 detects when the lens arrives at the pre-determined position when there is an error set signal at input 119.

In the circuit above, the direction of motor rotation is decided by which OR circuit delivers a signal. When no error signal is at 109 (in its low state), such a low state can be inverted by inverter 121 and fed to inputs of AND circuits G28 and G29. Under this condition, the motor driving signal is fed back to 97 or 98. Thus, the input of either AND circuit G28 or G29 becomes high and sends a high output to motor 24 through OR circuit G30 or G31 to rotate motor 24 in a clockwise or a counterclockwise direction for focusing lens 16 on the object. When an error focus signal is input to end 109, the two inputs of either one of the two AND circuits are unbalanced, and the output is low thus stopping the lens driving motor 24. When lens position detecting mechanism 130 is not connected, one input of the exclusive OR circuit G25 is high; it is an input of AND circuit G22 an input of AND circuit G21 (after being inverted from high to low by inverter 124). The output of exclusive OR circuit G25 is low since its two inputs are high and low. An error set signal at 119 provides one of the two high inputs of AND circuit G22, and the output from circuit G22 is fed to flip-flop circuit 123 to set it. The output from said flip-flop 123 is fed to AND circuit G27 and OR circuit G23. Since the error signal is the input from the 109 to another input of circuit G27, the output of circuit G27 becomes high and is fed to motor 24 through OR circuit G31 to rotate the motor. When lens is rotated by the motor 24 and when the lens position detecting mechanism 130 is connected, one input of exclusive OR circuit G25 becomes low and its two inputs are low and the output of circuit G25 is high. The two inputs of AND circuit G24 are high, and the high output of circuit G24 re-sets the flip-flop circuit 123 to stop motor rotation.

When lens position detecting mechanism 130 is connected, the input of exclusive OR circuit G25 is low and is fed to AND circuits G22 and G21, the latter is inverted from low to high by inverter 124. The output of circuit G25 is low since its two inputs are low and high. The error set signal is the input 119 and the two inputs of AND circuit G21 are high; therefore, the flip-flop 122 is set by the high output of AND circuit G21. The output from flip-flop 122 is fed to one input of AND circuit G26 and OR circuit G23. The other input of circuit G26 is the error signal from end 109, the high state output of circuit G26 is fed to motor 24 through OR circuit G30 to rotate the motor. When lens is rotated by motor 24 and the lens position detecting mechanism 130 becomes disconnected, the one input of exclusive OR circuit G25 is high. Since the two inputs of circuit G25 are high, the high output of circuit G25 re-sets the flip-flop circuit 122 through AND circuit G24 to which the high output from the flip-flop 122 is connected through OR circuit G23. Thus, the motor rotation is stopped.

Figures 8, 9:
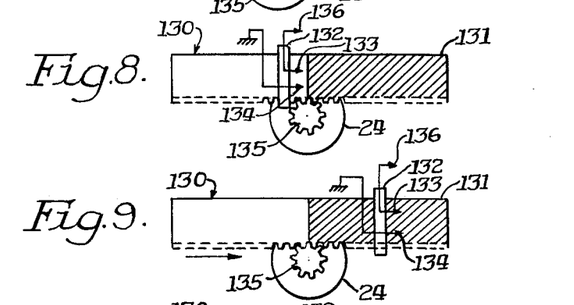

As shown schematically in FIGS. 7 through 11, the lens position detecting mechanism 130 includes a contact holder 132 having two contacts 133 and 134 (which holder is slidable on lens ring within a lens rotation range) and a lens set signal generating terminal 136. In FIGS. 7 through FIG. 9, the connecting condition between lens ring 131 and motor 24 are shown. On the axis of the motor 24, pinion 135 is engaged with the rack installed on the fringe of lens ring 131, and when motor is rotated, the lens ring is moved to leftside or rightside on drawing (actually, the lens ring is rotated so as to be moved forward or back). Lens ring 131 is from the electrical conductive part shown with cross hatching to the electrical non-conductive part which is shown without cross hatching.

In FIG. 7, when an error focus signal is generated and terminal 136 is on a non-conductive part, the output from terminal 136 becomes high and, as explained, rotates the motor 24 so the lens ring is moved in the direction shown. When contact holder 132 contacts the conductive part as shown in FIG. 9, the output from terminal 136 is low and stops motor rotation. When an error focus signal is generated and when the contact holder is against the conductive part as shown in FIG. 9, the output from terminal 136 is low, which rotates motor in clockwise direction and moves lens ring in the direction shown with arrow line. By this movement of lens ring, contacts 133 and 134 move to a non-conductive part, which stops motor rotation.

Figure 10:
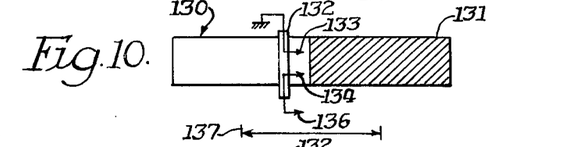
Figure 11:
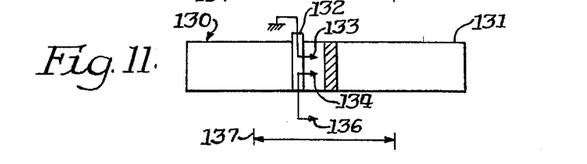

By setting the position of contact holder at the desired focusing position in advance, the lens position is set automatically at the pre-set position after an error focus signal is detected and repeated for the pre-determined number of cycles. FIG. 10 shws the lens ring movable range at 137 which covers the range from the infinity to the minimum focus. An alternative is shown in FIG. 11 where the conductive part is smaller, but with this arrangement the lens system is not moved the shortest possible distance. That kind of device, FIG. 11, is usually used for detecting the position.

Figure 3:
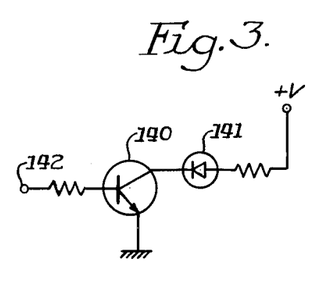
FIGS. 3 and 4 are circuit diagrams of error indicating devices which warn either visually or by sound.
Figure 4:
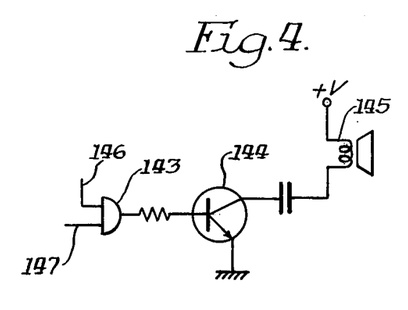

The circuits shown in FIGS. 3 and 4 are for the purpose of warning the camera user that the automatic focusing system is inoperative. In FIGS. 3 and 4 transistors 140 and 144 are connected to receive a signal from the lens control drive circuit which is indicative of a "no go" circumstance at their respective bases. The signal thus connects the emitter to the collector and completes a warning circuit to ground. In FIG. 3 the warning circuit is a light emitting diode in series with a power source and the emitter of transistor 140. In FIG. 4 a buzzer is in series with a power supply and the emitter of transistor 144. Consequently, a "no go" signal can be used to activate a cautionary warning which will alert the user to the fact that the limit of the automatic focus system has been exceeded. More particularly, the output from OR circuit G14 is input to the base of the transistor 140 and when error focus signal is input to end 142, transistor 140 becomes conductive and diode 141 emits light. This diode is preferably located in the viewfinder. FIG. 4 is the circuit used for indicating the error focus condition by sound; it has an AND circuit 143, a transistor 144, a speaker 145 including an amplifier, a resistor and a condenser. Input 146 can be an oscillating signal of some sound frequency and input 147 is the error focus signal. When the error focus signal is received at input 147, transistor 144 becomes conductive and the signal noise can be heard from the speaker.

As those skilled in the art will no doubt appreciate, changes and refinements can be made to the construction of the foregoing automatic focus control system and in its broader aspects it is intended that the appended claims will cover systems with a similar concept although constructed using different arrangements of electronic components.

What is claimed is:

1. For a camera having a focusable objective lens, and an automatic focusing system including a scanner optical system having a scanner means and a reference optical system wherein images of a remote subject are caused respectively to impinge on a detector means, the detector means generating an output signal representing the object distance of the subject when the images on the detector are coincident, and including means to compare and relate the orientation of said scanner system and the focus condition of the objective lens, the improvement in a means to adjust the focus of the objective lens to the object distance comprising:

reference means on said objective lens sensitive to variations in focus condition of said lens and for signaling the position of said lens, means supporting the scanner means for movement thereof, scanner driver means for driving said scanner means oscillatably, means on said scanner supporting means for engagement with said objective lens focus condition reference means for periodically signaling the position of said supporting means during its oscillation, a first control means connected to said lens for driving said lens in accordance with a predetermined setting when said detector signal is irregular such that said focusable lens is adjusted to a fixed focus position in accordance with said setting, a second control means for driving said lens in accordance with the compared difference between the timing of said periodic signal, said detector signal, and said lens position signal, electronic circuit means connected to said detector means for monitoring the frequency of the signals therefrom and for sorting said frequency into predetermined ranges said electronic circuit means including a first counter means connected to receive said detector signals and said periodic signals for determining the number of detector signals per scanner means oscillation, and circuit gating means connected to the outputs of said first counter means for directing a control signal to said first or second control means in accordance with the detector signal condition.

2. The system of claim 1 wherein said first counter means comprises a series of flip-flop circuits wired in cascade fashion to receive said detector signals and segregate same in accordance with their number per scanner means oscillation for determining whether said first or second control means will be used whereby the range of said number of signals is the threshold across which said detector signals are considered regular.

3. The system of claim 2 wherein said range is set between two and five signals per oscillation to condition the camera automatic focus system to respond in accordance with the nature of the subject available to be photographed whereby said range is acceptable for automatic focus control by said second control means.

4. An automatic focus adjusting apparatus for a camera comprising:

a focusing lens means to sharpen the subject image at the film plane, a scanning optical system for gathering light from predetermined portions of the field of view, a reference optical system for gathering light from predetermined part of the field of view, interconnecting means between said lens means and said scanning system for comparing the field of scan to the position of said lens means, detector means responsive to gathered light for emitting a series of signals, the relative timing of which is definitive of the distance from the apparatus to the subject, a scanning system position including means associated with said scanning system for defining the direction of scan of said system by timed signals indicative of the period of the scan, a first threshold means for counting said detector signals during each scan and separating same in accordance with their frequency into a first group and a second group, a first electronic circuitry including gating means connected for receiving detector signals of said first group from said first threshold means when said signals are error signals and for driving said lens to a predetermined fixed focus position, and a second electronic circuitry including gating means connected to said first threshold means for receiving detector signals of said second group from said first threshold means when said signals are regular and for driving said lens to the proper focus position in accordance therewith to automatically focus said lens.

5. The apparatus of claim 4 wherein a second threshold means is connected to the outputs of said first and second electronic circuitry to monitor the frequency of signals of said first and second groups and to connect either of said outputs to a lens control means for adjusting said lens in accordance with said outputs if the frequency thereof is beyond a predetermined level.

6. The apparatus of claim 5 wherein said second group includes signals between two and five per scan and said first group in all other frequencies.

7. The apparatus of claim 6 wherein said output frequency consists of more than four scans.

8. The apparatus of claim 7 wherein a warning device is connected to receive the output of said first group for indicating when the automatic focusing is not adjusting the lens.

9. The apparatus of claim 8 wherein said warning device is audible.

10. The apparatus of claim 8 wherein said warning device is visual.

* * * * *

UNITED STATES PATENT OFFICE
CERTIFICATE OF CORRECTION

PATENT NO. : 4,146,316
DATED : March 27, 1979
INVENTOR(S) : Noriaki Osawa

It is certified that error appears in the above-identified patent and that said Letters Patent are hereby corrected as shown below:

Column 12, line 39 (Claim 4, line 16), change "including" to --indicating--.

Column 12, line 68 (Claim 6, line 3), change "in" to --is--.

Signed and Sealed this

Twenty-sixth Day of June 1979

[SEAL]

Attest:

RUTH C. MASON
Attesting Officer

DONALD W. BANNER
Commissioner of Patents and Trademarks